(12) United States Patent
Wu et al.

(10) Patent No.: US 10,375,104 B1
(45) Date of Patent: Aug. 6, 2019

(54) SYSTEM AND METHOD FOR DETERMINING A DECAYED THREAT SCORE

(71) Applicant: Symantec Corporation, Mountain View, CA (US)

(72) Inventors: Shang-Chieh Wu, San Jose, CA (US); Ranjani Gunupudi, Palo Alto, CA (US); Rehan Jalil, Portola Valley, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 299 days.

(21) Appl. No.: 15/391,588

(22) Filed: Dec. 27, 2016

(51) Int. Cl.
*H04L 29/06* (2006.01)

(52) U.S. Cl.
CPC ...... *H04L 63/1433* (2013.01); *H04L 63/1416* (2013.01); *H04L 63/1425* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 2011/0178942 A1* | 7/2011 | Watters | G06Q 10/06 705/325 |
| 2016/0359900 A1* | 12/2016 | Crisler | H04L 63/1441 |

* cited by examiner

*Primary Examiner* — Andrew J Steinle
(74) *Attorney, Agent, or Firm* — Maschoff Brennan

(57) ABSTRACT

According to one embodiment, a computer-implemented method performed by a computing device comprising at least one processor, the method comprising determining a threat score for a user action in a computer application and calculating a decayed threat score based on the determined threat score and a damping factor. The threat score being indicative of a risk presented by the user action, the decayed threat score being a modified threat score for the user action, and the damping factor being a constant value used to reduce the determined threat score.

10 Claims, 4 Drawing Sheets

US 10,375,104 B1

SYSTEM AND METHOD FOR DETERMINING A DECAYED THREAT SCORE

TECHNICAL FIELD

This disclosure relates in general to threat scores and more particularly to a system and method for determining a decayed threat score.

BACKGROUND

Sensitive information stored to a network drive such as a cloud service may be put at risk by the actions of users of the network. As an example, a user may download a confidential document stored on the cloud service and thereafter share the document with a person who otherwise would not or should not have access to the document. Traditional security software may detect and evaluate such user actions to determine whether the action puts the sensitive information at risk. In doing so, the confidentiality of information may be maintained.

SUMMARY OF THE DISCLOSURE

According to one embodiment, a computer-implemented method performed by a computing device comprising at least one processor, the method comprising determining a threat score for a user action in a computer application and calculating a decayed threat score based on the determined threat score and a damping factor. The threat score being indicative of a risk presented by the user action, the decayed threat score being a modified threat score for the user action, and the damping factor being a constant value used to reduce the determined threat score.

Certain embodiments may provide one or more technical advantages. For example, an embodiment of the present disclosure may improve the security of information. As another example, an embodiment of the present disclosure improves the accuracy of a threat score by changing the threat score when it does not accurately represent a risk to information. By doing so, an embodiment of the present disclosure improves detection of risky users, actions, and/or applications. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Traditional security systems may identify and evaluate the risk presented by a particular action by a user on an application. The risk is often represented as a value, commonly referred to as a threat score. As an example, the threat score may be represented as a value between 0-100, wherein 0 indicates no risk and 100% indicates a maximum security risk. However, the threat score corresponding to a particular action may not be representative of the risk associated with a particular user, a particular action, and/or a particular application. Imagine a scenario wherein an employee of an organization is asked by his supervisor to take an application action that is commonly performed by the supervisor. Because the employee may not have the same clearance level and/or system authorization, the threat score determined for the employee's action may be 85, even though that same action when performed by the supervisor registers as a threat score of 5. Thus, the employee may be flagged as a security risk based on a single instance of sanctioned actions. Accordingly, the threat score of a particular user action may be an inaccurate and/or unreliable method of determining whether a particular user, action, and/or application is a security risk. Further, traditional security systems may be too rigid and unforgiving to accurately evaluate the security risk associated with users, actions, and/or applications.

The teachings of this disclosure recognize determining an aggregate threat score that accounts for actions of one or more users. The aggregate threat score may be a more accurate representation of whether a particular user, action, and/or application presents a security risk because it is not solely based on a singular incident. Additionally, this disclosure recognizes that a threat score initially determined for a particular user action may decay (e.g., be reduced) over time. Such a threat score is referred to herein as a decayed threat score. As will be described in more detail below, a threat score may be decayed in particular instances such as when a user action is identified as being nonthreatening (e.g., a normal behavior of the user, user action was a one-time occurrence).

Figure 1:
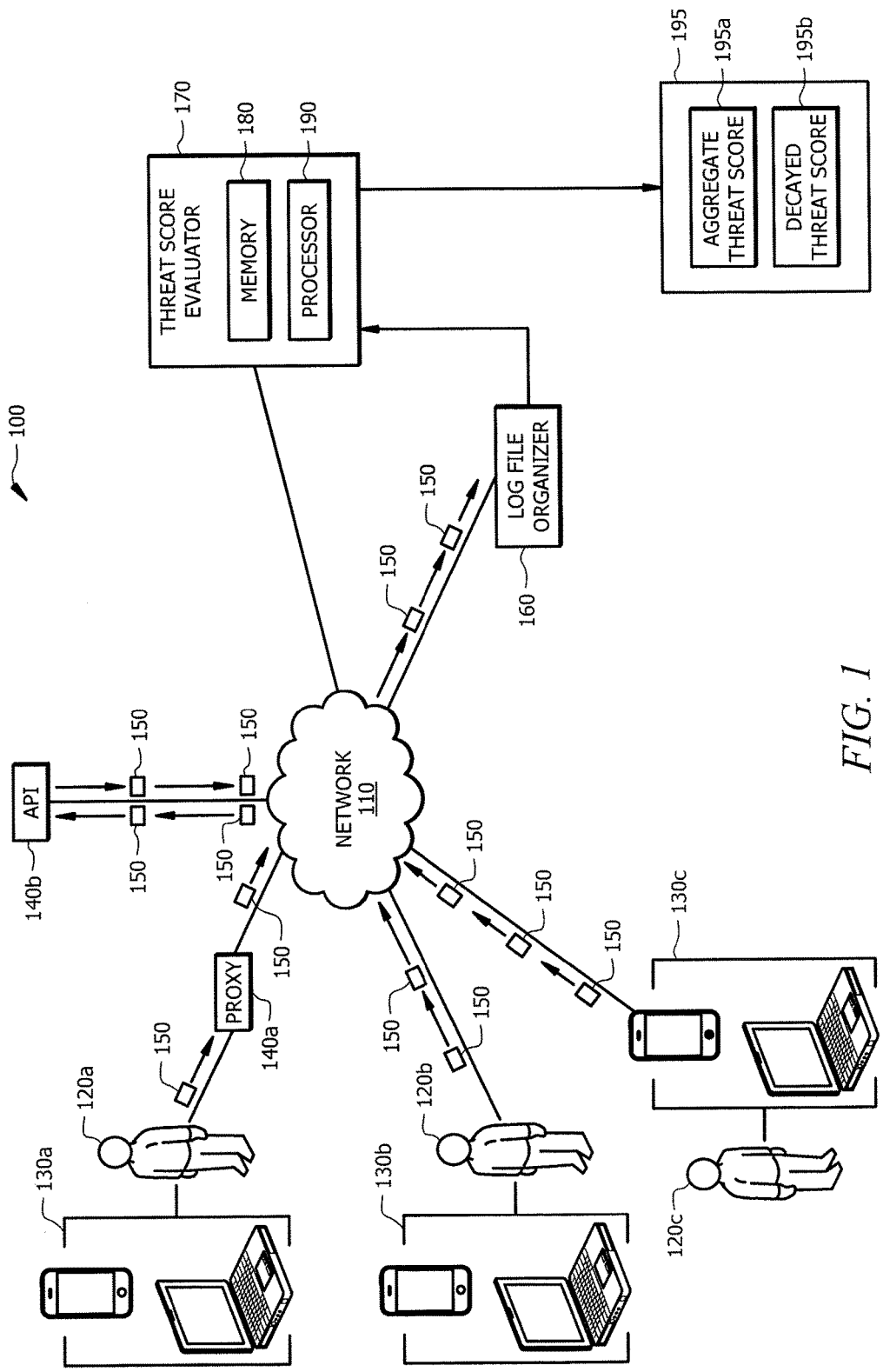
FIG. 1 is a schematic illustrating an example network environment for a threat score evaluator for determining threat scores corresponding to actions of one or more users, according to certain embodiments.

FIG. 1 illustrates a network environment for a system for a threat score evaluator 170. In some embodiments, threat score evaluator 170 is configured to determine an aggregate threat score 195a for a particular user, action, and/or application. In some other embodiments, threat score evaluator 170 is configured to determine a decayed threat score 195b for a particular user action. In general, the teachings of this disclosure recognize calculating an aggregate and/or a decayed threat score 195 to identify unwanted user behavior. As described above, an aggregate threat score 195a may be a value indicating the riskiness of a particular user, action, and/or application based on actions of one or more users. In other words, the aggregate threat score 195a is a numerical representation of the threat presented by a particular user, action, and/or application. As was also described above, a decayed threat score 195b is a threat score that has been downwardly adjusted from an original threat score assigned to a particular user action. This may be the case in a scenario in which a user action has been deemed non-threatening. Because the aggregate threat score 195a may account for threat scores assigned to actions of one or more users, the aggregate threat score 195a may change based on one or more decayed threat scores 195b.

Network environment 100 of FIG. 1 may comprise one or more users 120 communicating over network 110 with one or more devices 130 and for users 120. These user communications will be referred to herein as log file data 150. In some embodiments, log file data 150 is collected by one or more data capturing devices 140 in network environment 100 and the log file data 150 is assessed to determine whether a particular user action is a threat. As an example, user 120a may download a file from GOOGLE DRIVE™ using device 130a. Such user action is recorded as a log file entry and is sent to a data capturing device 140 such as a proxy server 140a or an Application Programming Interface (API) 140b. In some embodiments, the log file data 150 collected by data capturing device 140 may be used by threat score evaluator 170. As an example, threat score evaluator 170 may use the collected log file data 150 to determine an aggregate threat score 195a for a particular computer user, action, and/or computer application. As another example, threat score evaluator 170 may use the collected log file data 150 to determine a decayed threat score for a particular user action 195b.

Network 110 may refer to any interconnecting system capable of transmitting audio, video, signals, data, messages, or any combination of the preceding. Network 105 may include all or a portion of a public switched telephone network, a public or private data network, a local area network (LAN), an ad hoc network, a personal area network (PAN), a metropolitan area network (MAN), a wide area network (WAN), a local, regional, or global communication or computer network such as the Internet, an enterprise intranet, or any other suitable communication link, including combinations thereof. One or more portions of one or more of these networks may be wired or wireless. Example wireless networks 100 may include a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these.

As described above, network environment 100 may include one or more users 120. As depicted in FIG. 1, network environment 100 includes three users 120a-c. Users 120 may send and receive information (collectively, log file data 150) over network 110 using devices 130. In some embodiments, users 120 are associated with a single entity (e.g., employees of a particular company). In other embodiments, some users 120 are associated with a particular entity and other users 120 are not associated with the particular entity. For example, user 120a may be a rogue employee of Company A who wishes to provide sensitive information about Company A to user 120b, a non-employee of Company A. Further, user 120c may be a system administrator of Company A tasked with detecting unwanted user behavior related to Company A's information. In such an example, user 120c may use threat score evaluator 170 to determine threat scores associated with one or more actions of user 120a.

Device 130 may be an electronic device including hardware, software, or embedded logic components or a combination of two or more such components and capable of carrying out the appropriate functionalities implemented or supported by device 130. As an example and not by way of limitation, a device 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client device 130.

As described above, device 130 may be communicatively coupled to one or more components of network 110 (e.g., data capturing devices 140, log file organizer 160, and/or threat score evaluator 170). In some embodiments, device 130 may include a web browser, such as MICROSOFT INTERNET EXPLORER, GOOGLE CHROME, or MOZILLA FIREFOX, and may have one or more add-ons, plug-ins, or other extensions. A user of device 130 may enter a Uniform Resource Locator (URL) or other address directing the web browser to a particular server, and the web browser may generate a Hyper Text Transfer Protocol (HTTP) request and communicate the HTTP request to an HTTP server. The server may accept the HTTP request and communicate to device 130 one or more files responsive to the HTTP request. The responsive files may include one or more Hyper Text Markup Language (HTML) files, EXtensible Markup Language (XML) files, JavaScript Object Notation (JSON) files, Cascading Style Sheets (CSS) files, pictures, other files, or any other suitable data that is transferable over HTTP. Device 130 may render a webpage based on the responsive files from the server for presentation to a user.

Network environment 100 may also comprise one or more data capturing devices 140 configured to capture log file data 150. Log file data 150 may be recorded and stored in components of network environment 100 and used by system administrators and/or software to ascertain underlying actions taken by a user 120 of a device 130. As an example, network environment 100 may comprise a proxy server 140a and/or an application programming interface (API) 140b) configured to capture log filedata 150. As depicted in FIG. 1, network environment 100 comprises both a proxy server 140a and an API 140b. In this example, log file data 150 from user device 130a is captured by proxy server 140a and log file data from user devices 120b-c is captured by API 140b. In some embodiments, the data capturing devices 140 send the collected log file data 150 to other components of network environment 100. For example, the data capturing devices 140 may send the collected log file data 150 to log file organizer 160 and/or threat score evaluator 170. Log file data 150 may be sent periodically or upon request.

Network environment 100 includes a log file organizer 160 in some embodiments. Log file organizer 160 may be configured to receive log file data data 150 from one or more data capturing devices 140 (e.g., proxy server 140a and/or API 140b) and organize the received log file data 150. In some embodiments, organizing the received log file data 150 comprises identifying portions of each log file and classifying the portions into one or more categories. For example, log file organizer 160 may, for each log file in log file data 150, identify a source of the log file entry, a user associated with the log file entry, a service associated with the log file entry, an object associated with the log file entry, and/or an action associated with the log file entry. As will be described in more detail below, a "source" may refer to the data capturing device 140 that collected a particular log file entry (e.g., proxy server 140a, API 140b), a "user" may refer to the user 120 associated with the device 130 that sent or received information associated with the particular log file entry, a "service" may refer to the computer application or program associated with a particular log file entry, an "object" may refer to an object (e.g., file, folder, spreadsheet) of interaction associated with a particular log file entry, and an "action" may refer to an action (e.g., view, download, upload, share) taken with respect to an object within a particular log file entry. As an example, proxy server 140a may record a log file entry corresponding to user 120a sharing a folder stored to the cloud-based storage drive Box. Log file organizer 160 may receive the log file entry and identify the source of the entry as proxy server 120a, the user of the entry as user 120a, the service of entry as Box, the object of the entry as a folder, and the action of the entry as sharing. In some embodiments, log file organizer 160 sends or otherwise makes the organized information available to threat score evaluator 170.

Threat score evaluator 170 may be present in the network environment 100 in some embodiments. Threat score evaluator 170 may, in some embodiments, be a computerized system. Threat score evaluator may comprise a memory 180 and a processor 190 in some embodiments. Threat score evaluator 170 may be executable software in some embodiments. In other embodiments, threat score evaluator 170 may be or comprise hardware. For example, threat score evaluator 170 may be a computer such as computer 600 of FIG. 5. In yet other embodiments, threat score evaluator 170 may comprise a combination of software and hardware.

Threat score evaluator 170 may be configured to receive organized log file information from log file organizer 160 and use the received information to evaluate threat scores 195. As explained above, threat score evaluator 170 may, in some embodiments, use the log file information to determine one or more of an aggregate threat score 195a for a particular user, action, and/or action. In other embodiments, threat score evaluator 170 may use the log file information to determine one or more decayed threat scores 195b.

Threat score evaluator 170 includes a memory 180 in some embodiments. Memory 180 may be configured to store logic operable to determine an aggregate threat score 195a and/or a decayed threat score 195b. As an example, memory 180 may be configured to store the computer-implemented methods described below in reference to FIGS. 4 and 5. In some embodiments, the logic stored in memory 180 may be executed by processor 190. In addition to the logic stored in memory 180, processor 190 may also use the log file information received from either data capturing devices 140 and/or log file organizer 160 to determine threat scores 195.

As explained above, threat scores 195 determined by threat score evaluator 170 may aid in the identification of risky users, applications, and/or actions of users. For example, threat score evaluator 170 may determine that user 120a's aggregate threat score 195a is 75 and that user 120b's aggregate threat score 195b is 50. Although threat score evaluator 170 has identified both users 120 as being a risk, the aggregate risk score may be used by a system administrator to identify which user presents more of a threat to the system. For example, based on the aggregate threat scores 195a for users 120a-b, the system administrator may prioritize the risk created by user 120a over the risk created by user 120b and choose to address a concern about user 120a before addressing the concern about 120b. The aggregate threat score 195a may also be used to trigger a system lock or suspension. For example, the system administrator may define a threshold (e.g., an aggregate threat score of 95) that is used to determine whether a user account should be locked or suspended due to the risk presented by that user. In such an example, the aggregate threat score determined by threat score evaluator 170 may be compared to the defined threshold to determine whether to lock or suspend the account of a particular user. Such lock or suspension may be temporary or permanent. Although the example above describes locking or suspending user activity corresponding to a particular user, this disclosure recognizes that threat score evaluator 170 may lock or suspend user activity corresponding to a particular computer application or a particular action in response to determining that an aggregate threat score 195a has exceeded a defined threshold. As an example, user activity may be locked or suspended by disabling a user account, a computer application, or an action. As another example, user activity may be suspended by requesting or notifying a user responsible for the user action to cease a particular activity.

Aggregate threat score 195a may be calculated by threat score evaluator 170. In some embodiments, threat score evaluator 170 calculates aggregate threat score 195a by determining, by comparing two or more assigned threat scores, the greatest of the two or more assigned threat scores, and summing together the greatest of the two or more assigned threat scores with contributions of the other assigned threat scores. As an example, threat score evaluator 170 may be instructed to calculate an aggregate threat score for the user action "upload" and therefore identify, within log file data 150, each instance wherein a log file included the "upload" action. Threat score evaluator 170 may identify four instances of the "upload" action and determine threat scores for each instance based on conventional methods of determining a threat score for a user action. In such an example, threat score evaluator 170 may assign the threat scores 10, 20, 35 and 70 to the first, second, third, and fourth identified user actions, respectively. Threat score evaluator 170 may use these threat scores to calculate an aggregate threat score 195a for the "upload" action. For example, in some embodiments, threat score evaluator may compare the assigned threat scores (e.g., 10, 20, 35, and 70) and determine the greatest of the assigned threat scores (e.g., 70). Threat score evaluator 170 may then sum together the greatest of the assigned threat scores (e.g., 70) with contributions of the remaining assigned threat scores. As used herein, a "contribution" refers to a portion of an assigned threat score. In some embodiments, determining a contribution of an assigned threat score comprises calculating the contribution. The contribution may be calculated based on a function. In some embodiments, the contribution is calculated based on a monotonic increasing convex function. As an example, the contribution of an assigned threat score may be calculated using the following function:

$$f(x) = e^{ln(margin+1)*x/maxTS} - 1$$

wherein e corresponds to Euler's number, the margin corresponds to a difference between a maximum threat score remaining and one of the assigned threat scores, x corresponds to an assigned threat score that is not the greatest of the assigned threat scores, and maxTS is the maximum threat score that can be assigned. For each example described herein, the maximum threat score is 99.

As an example of how the above-function may be applied, consider the above example wherein threat scores of 10, 20, 35 and 70 were assigned. The greatest of the assigned threat scores may set a baseline for aggregate threat score 195a, such that the aggregate threat score will be no less than the greatest of the assigned threat scores. Additionally, a contribution of each of the remaining assigned threat scores (e.g., 10, 20, and 35) will be calculated and summed together with the greatest of the assigned threat score (e.g., 70) to compute the aggregate threat score 195a. An example algorithm for computing the contribution of the second greatest threat score of a plurality of assigned threat scores may be as follows: (1) identify, by comparing the assigned threat scores, the greatest of the assigned threat scores (e.g., 70); (2) identify, by comparing the remaining of the assigned threat scores (e.g., 10, 20, 35), the next greatest assigned threat score; (3) calculate a margin, by subtracting, the greatest of the assigned threat scores (e.g., 70) from the maximum threat score (e.g., 99); (4) determine the product of a) the natural log of the calculated margin plus one, and b) the quotient of the next greatest assigned threat score (e.g., 35) and the maximum threat score (e.g., 99); 5) compute e to the power of the determined product; and 6) subtract one.

Using the described algorithm, the contribution of an assigned threat score may be calculated. For example, the contribution of the user action having an assigned threat score of 35 is calculated to be 2.328 using the above-described algorithm. The contribution of the user actions having assigned threat scores of 20 and 10 may be calculated similarly using modified margins. In some embodiments, the margins are modified based on an adjusted value of the remaining maximum threat score. As an example, the contribution of the user action corresponding to the assigned threat score 20 may be calculated using a margin of 26.672 (e.g., margin 2 ($m_2$) may be equal to 99-70-2.328) and the contribution of the user action corresponding to the assigned threat score 10 may be calculated using a margin of 25.716 (e.g., margin 3 ($m_3$) may be equal to 99-70-2.328-0.956). Accordingly, the contribution of the user action corresponding to the assigned threat score 20 may be 0.956 and the contribution of the user action corresponding to the assigned threat score 10 may be 0.394. As such, the aggregate threat score 195a for the "upload" action may be 73.678.

Threat score evaluator 170 may also reassess previously determined threat scores corresponding to particular user actions. Reassessment of a threat score may result in a decayed threat score 195b. In some embodiments, threat score evaluator 170 determines decayed threat score 195b based on an originally determined threat score and a damping factor. The original threat score may be determined using any suitable method, including methods used by those having ordinary skill in the art to determine the risk presented by a particular user action. The damping factor may, in some embodiments, be a numerical value between 0 and 1. The damping factor may be used to scale down the value of the originally determined threat score. In some embodiments, the damping factor may be a constant value that is determined by a system administrator. Thus, in some embodiments, decayed threat score 195b may be represented by the following function: $f(x)=D*x$, wherein D is the damping factor and x is the originally determined threat score. Applying the above formula, a user action having an originally determined threat score of 30 will have a decayed threat score of 27 when the damping factor is 0.9.

Decayed threat score 195b may also be based on a damping interval in some embodiments. The damping interval may define how often (e.g., based on time or number of logs) to dampen the threat score. As an example, a threat score may have a damping interval of one week such that a particular user action originally assigned a threat score of 30 for the first week may be reduced to a 27 on the first day of the second week, which is reduced further to a 24.3 on the first day of the third week, etc. In some embodiments, a system administrator may define a maximum number of times that a threat score may be defined. For example, a system administrator may determine that the maximum number of decays for a particular user action is 5. In such an example, a user action originally assigned a threat score of a 30 may be reduced, at most, to 17.7147.

This disclosure recognizes that decayed threat scores 195b may be restricted in other ways as well. In one embodiment, a system administrator may define ranges of threat scores that correspond to varied risk levels. For example, a system administrator may define a low risk as threat scores of 0-20, a medium risk as threat scores of 21-60, a high risk as threat scores of 61-90, and a severe risk as threat scores of 91-100. In such an embodiment, threat score evaluator 170 may not permit a threat score to decay to a value below its originally determined risk level. For example, threat score evaluator 170 may assign a particular user action a threat score of 60, thereby assigning it in the medium risk level. If threat score evaluator 170 later determines that the user action was non-threatening, threat score evaluator 170 may determine to decay the threat score as described herein. However, the decay of the threat score may be restricted by the minimum value of the medium risk level (e.g., threat score of 20). Stated otherwise, the threat score assigned to the user action may decay over time but may not decay to a value below 20.

Determining whether to decay a threat score may, in some embodiments, correspond to a determination that a particular user action is non-threatening. For example, a user action may be originally assigned a high threat score (e.g., threat score of 70) when the user takes an action that is atypical for that user. Subsequently, the user does not take any further actions that register as risky. As such, threat score evaluator 170 may determine that the particular user action (e.g., uploading 10 documents at one time) was not a cause for alarm and may determine that the originally assigned threat score may be decayed as discussed above. As another example, a user action may be originally assigned a high threat score when the user takes a particular action (e.g., downloads a document) for the first time. The user subsequently takes that action a plurality of times and the system administrator receives confirmation from the user's supervisor that the user is authorized to take that particular action. This authorization may be indicated to threat score evaluator 170, which may then take the necessary steps to decay the originally assigned threat score.

As described above, an aggregate threat score 195a determined by threat score evaluator 170 may be adjusted based on one or more decayed threat scores 195b. Accordingly, an aggregate threat score calculated for a particular computer user, action, and/or computer application may change over time. For example, threat score evaluator 170 may calculate an aggregate threat score 195a for a particular application based on three user actions taken on the application. The three user actions may, on day one, be assigned threat scores of 10, 15, and 40, respectively. Using these threat scores, threat score evaluator 170 may determine the aggregate threat score 195a for the application is 41.3697. One week later, threat score evaluator 170 may determine to decay the threat score of 40 corresponding to the third user action using a damping factor of 0.5 and a damping interval of 1 week. As such, threat score evaluator 170 may determine the aggregate threat score 195a for the application based on the three user actions is 21.497 on the seventh day. Thus, although the application was seemingly risky at week one, the same application was evaluated to be about half as risky only one week later. Although this disclosure provides the above example using specific threat scores, damping factors, and damping intervals, this disclosure recognizes that one of ordinary skill in the art may use any suitable value for these and other variables in determining an aggregate threat score 195a and/or a decayed threat score 195b.

Figure 2:
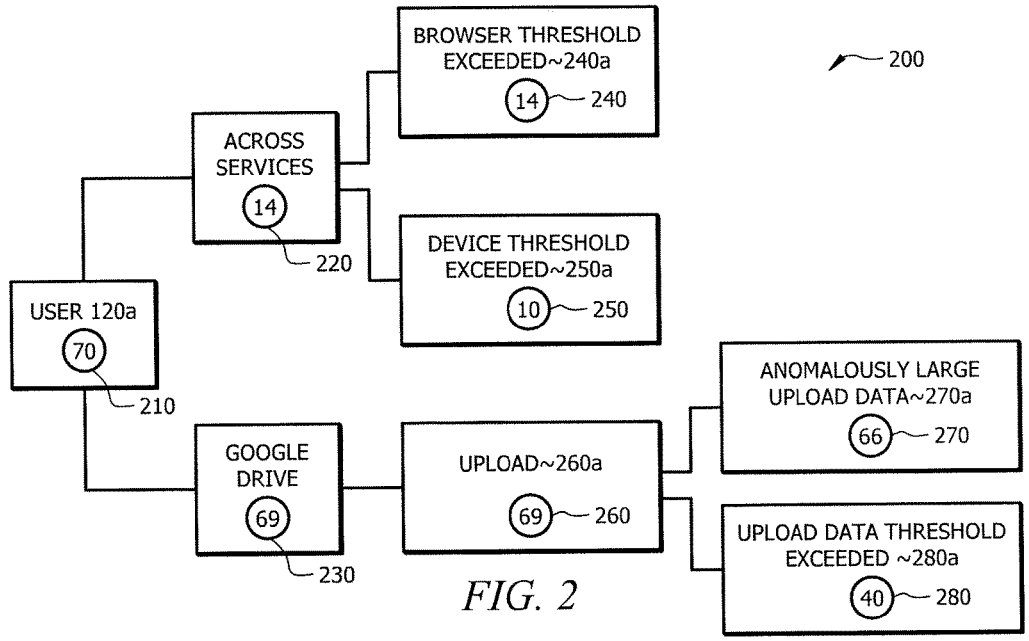
FIG. 2 is an example of a risk level tree illustrating one or more threat scores determined by the threat score evaluator of FIG. 1, according to a particular embodiment.
Figure 3:
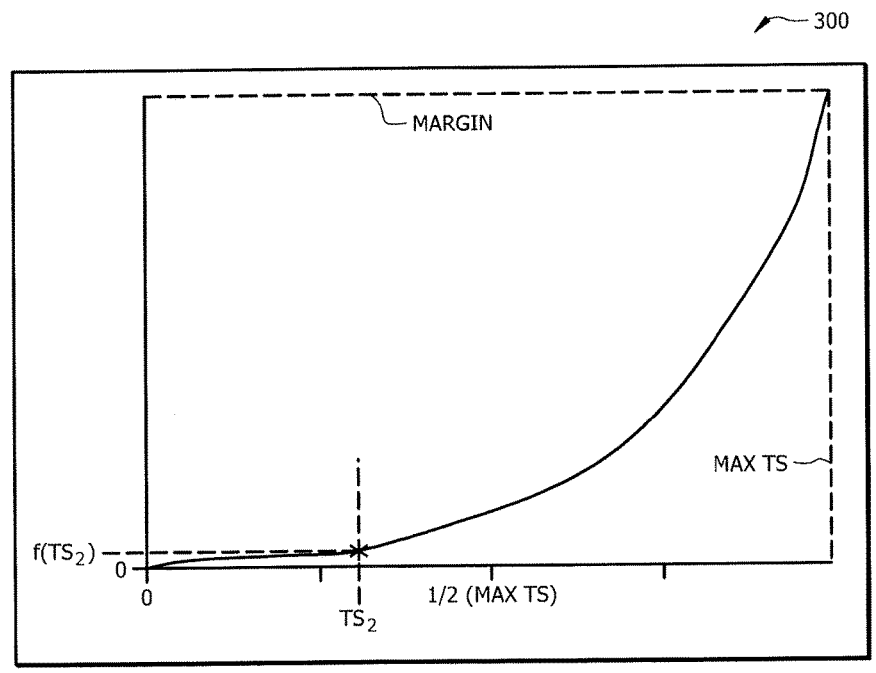
FIG. 3 is a graph illustrating an example function that may be used by the threat score evaluator of FIG. 1 to determine a contribution of one or more threat scores, according to a certain embodiment.
Figure 4:
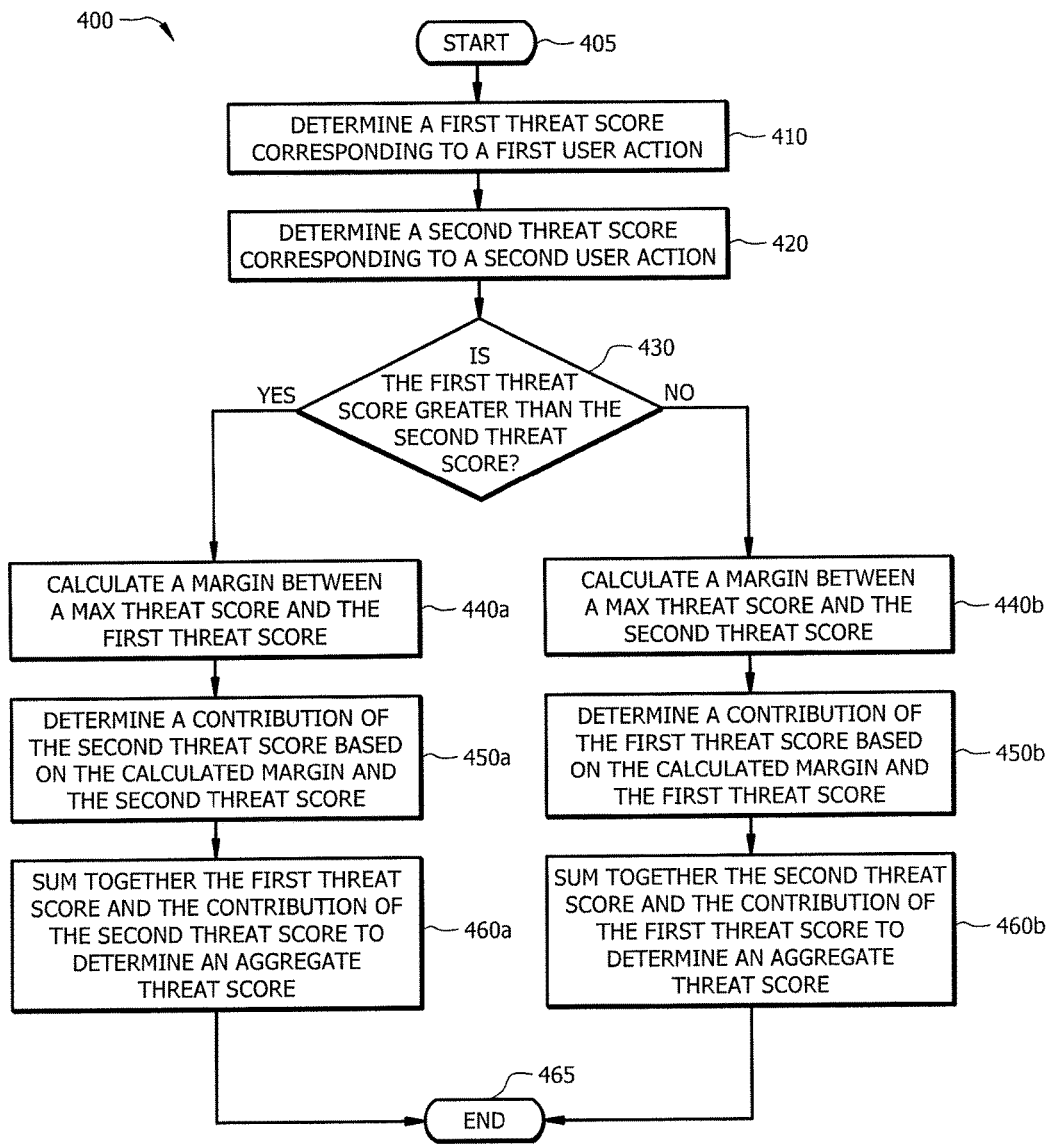
FIG. 4 is a flow chart illustrating a method of determining an aggregate threat score using the threat score evaluator of FIG. 1, according to certain embodiments.
Figure 5:
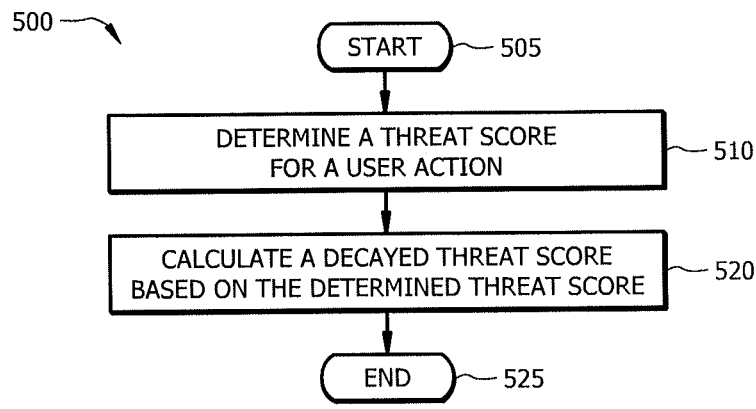
FIG. 5 is a flow chart illustrating a method of determining a decayed threat score using the threat score evaluator of FIG. 1, according to certain embodiments.
Figure 6:
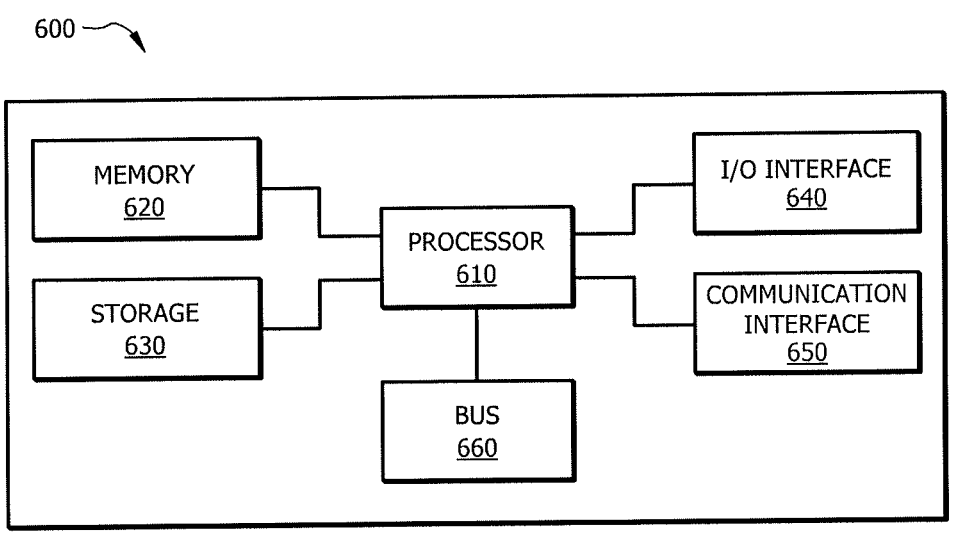
FIG. 6 is a block diagram illustrating an example of a computer system that may execute the methods of FIGS. 4 and 5, according to certain embodiments.

Accordingly, this disclosure recognizes a threat score evaluator 170 to determine aggregate and/or decayed threat scores based on actions of one or more users. FIG. 2 is an example of a risk level tree illustrating one or more threat scores determined by threat score evaluator 170. FIG. 3 illustrates an example function used by threat score evaluator 170 to determine a contribution of an aggregate threat score and FIGS. 4 and 5 illustrate methods that may be executed by threat score evaluator 170. Finally, FIG. 6 illustrates an example of a computer system that may execute the methods of FIGS. 4 and 5.

As described above, FIG. 2 depicts a risk level tree 200 illustrating the threat scores assigned to particular user actions and aggregate threat scores calculated based on the user actions. For example, as depicted in FIG. 2, user 120a is assigned an aggregate threat score of 70 (see 210). This threat score may, in some embodiments, be calculated by threat score evaluator 170 using methods described herein. As depicted in FIG. 2, aggregate threat score 210 is based on aggregate threat scores 220 and 230, corresponding to threat scores of one or more applications. For example, aggregate threat score 220 corresponds to the threat score associated with all applications (also referred to herein as "services") used by user 120a with the exception of GOOGLE DRIVE™ and aggregate threat score 230 corresponds to the threat score associated with GOOGLE DRIVE™. These aggregate threat scores 220-230 may be based on the actions of user 120a on the one or more applications. For example, aggregate threat score 220 is based on threat scores assigned to user actions 240a, 250a on services other than GOOGLE DRIVE™. As depicted, threat score 240 assigned to user action "browser threshold exceeded" (240a) is 14 and threat score 250 assigned to user action "device threshold exceeded" (250a) is 10. As described above, threat scores may be assigned to particular user actions in any suitable manner. These two threat scores (threat scores 240 and 250) may be used as the basis to calculate the aggregate threat score 195a for user actions across services other than GOOGLE DRIVE™ (aggregate threat score 220). As depicted, threat score evaluator 170 calculated the aggregate threat score 220 as 14.

Aggregate threat score 210 is also based on aggregate threat score 230 corresponding to user 120a's actions on GOOGLE DRIVE™. As represented in FIG. 2, threat score evaluator 170 calculated aggregate threat score 230 as 69. Based on FIG. 2, user 120 has taken upload actions (see 260a) on GOOGLE DRIVE™ which have been calculated to have an aggregate threat score of 69 (see 260). These upload actions 260a comprise an "anomalously large upload data" action 270a and an "upload data threshold" action 280a that have been assigned threat scores of 66 and 40, respectively. Although this disclosure describes and depicts calculating aggregate threat scores 195a based on a single user's actions, this disclosure recognizes that aggregate threat scores may be calculated based on more than one user's actions.

FIG. 3 depicts a graph 300 illustrating an example of a function that may be used to determine a contribution of a threat score, which may in turn be used to calculate aggregate threat score 195a. As explained above, the aggregate threat score may be determined by threat score evaluator 170 which may use any monotonic increasing convex function to determine contributions of assigned threat scores. The contributions may be summed together with the greatest of the assigned threat scores to determine an aggregate threat score for a particular user, application, and/or action. The graph 300 illustrates a domain from 0 to maxTS and a range from 0 to a calculated margin. In some embodiments, the calculated margin may correspond to a remainder of the maximum threshold. As an example, if a first threat score is 70 and the maximum threat score is 99, the margin may be 29. As another example, if a first threat score is 70, the maximum threat score is 99, and the contribution of a second threat score is calculated to be 2.328, the calculated margin may be 26.672. Graph 300 also illustrates determining a contribution of $TS_2$ using the plotted function: $f(x)=e^{ln(margin+1)*x/maxTS}-1$. According to graph 300, the contribution of $TS_2$ is a value between 0 and the calculated margin, designated in FIG. 300 as $f(TS_2)$.

FIG. 4 depicts a method 400 of calculating aggregate threat score 195a. As explained above, aggregate threat score 195a may be calculated by threat score evaluator 170 and the aggregate threat score 195a may be used to prioritize the risk presented by a particular user, application, and/or action. The method 400 may be implemented by a computer in some embodiments. As such, method 400 may be stored in memory (such as memory 180 of FIG. 1) and executed by a processor (such as processor 180 of FIG. 1). In some embodiments, the method 400 may begin in a step 405 and proceed to a step 410.

At step 410, threat score evaluator 170 determines a first threat score corresponding to a first user action. In some embodiments, the threat score is determined based on one or more of (1) the source (e.g., data collection device 140) that collected the log file data 150 associated with the user action; (2) the user associated with the user action; (3) the application corresponding to the user action; (4) the object corresponding to the user action; and (5) the action corresponding to the user action. As described above a threat score for a particular user action may be determined in any suitable manner, including conventional methods utilized by persons of ordinary skill. As an example, threat score evaluator 170 may determine at step 410 that the first user action has a threat score of 70. In some embodiments, after determining the threat score for the first user action, the method 400 proceeds to a step 420.

At step 420, threat score evaluator 170 determines a second threat score corresponding to a second user action. As described above, the threat score corresponding to the second user action may be determined in any suitable manner. In some embodiments, after determining a threat score for the second user action, the method 400 proceeds to a decision step 430.

At step 430, threat score evaluator 170 determines whether the first threat score is greater than the second threat score. In some embodiments, this determination is based on a comparison of the first threat score to the second threat score. As used herein, determining whether a threat score is greater than another threat score comprises identifying which threat score is larger in value. If at step 430, threat score evaluator 170 determines that the first threat score is greater than the second threat score, the method 400 continues to a step 440a. Alternatively, if at step 430, threat score evaluator 170 determines that the second threat score is greater than the first threat score, the method 400 continues to a step 440b. After determining which of the two threat scores is greater, the method proceeds to a step 440.

At step 440, threat score evaluator 170 calculates a margin between a maximum threat score and the threat score determined to be greater at step 430. As such, at step 440*a*, threat score evaluator 170 calculates a margin between a maximum threat score and the first threat score. Alternatively, at step 440*b*, threat score evaluator 170 calculates a margin between a maximum threat score and the second threat score. In some embodiments, calculating a margin comprises computing the difference between the maximum threat score and the threat score determined to be greater at step 430. The margin may, in some embodiments, set a ceiling for the contribution that may be calculated by threat score evaluator 170 at step 450. In some embodiments, after calculating the margin at step 440, the method 400 may continue to a step 450.

At step 450, threat score evaluator 170 determines a contribution of the threat score determined to be the lesser of the first and second threat scores at step 430. So, at step 430*a*, threat score evaluator 170 may determine a contribution of the second threat score, and, at step 430*b*, threat score evaluator 170 may determine a contribution of the first threat score. In some embodiments, the contribution of the lesser threat score is determined based on the calculated margin and the lesser threat score. Determining the contribution of the lesser threat score may comprise calculating the contribution. In some embodiments, the contribution is calculated based on a monotonic increasing convex function. As an example, the contribution may be calculated using the following formula: $f(x)=e^{ln(margin+1)*x/maxTS}-1$. After determining a contribution of the lesser threat score, the method 400 may continue to a step 460.

At step 460, threat score evaluator 170 sums together the threat score determined to be greater at step 430 and the contribution determined at step 460. As such, threat score evaluator 170 sums together the first threat score and the contribution of the second threat score at step 460*a* and sums together the second threat score and the contribution of the second threat score at step 460*b*. In some embodiments, the sum of the greater threat score and the contribution of the lesser threat score is the aggregate threat score. In some embodiments, the method 400 proceeds to an end step 465 after summing together the greater threat score and the contribution of the lesser threat score.

In some embodiments, the method 400 includes one or more additional steps. For example, threat score evaluator 170 may determine a third threat score corresponding to a third user action. In such an embodiment, all three threat scores would be compared and a greatest threat score would be identified. Thereafter, the remaining two threat scores would be compared and a next greatest threat score would be determined. As an example, threat score evaluator 170 may assign threat scores of 70, 20, and 10 corresponding to the first, second, and third user actions. In such an example, threat score evaluator 170 may determine that 70 is the greatest among the three threat scores, 20 is the next greatest among the three threat scores, and 10 is the least among the three threat scores. Threat score evaluator 170 may then determine a contribution of the next greatest threat score according to step 450 described above. However, instead of proceeding to step 460, threat score evaluator may determine a contribution of the least greatest threat score (e.g., contribution of the third user action having a threat score of 10). In some embodiments, the contribution of the least greatest threat score is based on a newly calculated margin and the least greatest threat score. The new margin may be calculated by identifying a remainder of the maximum threat score. As an example, the new margin may be calculated using the following formula: maximum threat score−greatest threat score−contribution of the next greatest threshold.

Thus, taking the above example, the newly calculated margin may be 28.01 (compared to the margin of 29 calculated that may have been calculated at step 440) in some embodiments. The contribution of the third threat score may be calculated using a monotonic increasing convex function. As an example, when calculated using the formula $f(x)=e^{ln(margin+1)*x/maxTS}-1$, the contribution of the third threat score is 0.404. The aggregate threat score may then be determined by summing together the greatest threat score among all of the determined threat scores and the contributions of one or more other determined threat scores. Taking the above example, the aggregate threat score could be determined by summing together 70 (first threat score)+0.99 (contribution of the second threat score)+0.404 (contribution of the third threat score). In such an example, the aggregate threat score may be determined to be 71.39. Although this disclosure describes certain additional steps of method 400, this disclosure recognizes that method 400 may include any suitable steps.

FIG. 5 depicts a method 500 of calculating decayed threat score 195*b*. As explained above, decayed threat score 195*b* may be calculated by threat score evaluator 170 and decayed threat score 195*b* may be used to calculate aggregate threat score 195*a*. The method 500 may be implemented by a computer in some embodiments. As such, method 500 may be stored in memory (such as memory 180 of FIG. 1) and executed by a processor (such as processor 180 of FIG. 1). In some embodiments, the method 500 may begin in a step 505 and proceed to a step 510.

At step 510, threat score evaluator 170 determines a threat score for a user action. In some embodiments, the user action is an action performed by a user 120 in a particular application. As described above, user actions may include one or more of download, upload, share, and view. The threat score corresponding to the user action may be determined in any suitable manner. In some embodiments, the threat score may be based on one or more of a source, user, application, object, and action. After determining a threat score for the user action, threat score evaluator 170 may proceed to step 520.

At step 520, threat score evaluator 170 calculates a decayed threat score 105*b* based on the threat score determined at step 510. Decayed threat score 195*b* may be indicative of a threat score that has changed due to the passage of time. As described above, a threat score may be decayed upon a determination that a corresponding user action is non-threatening.

Decayed threat score 195*b* is also based on a damping factor in some embodiments. The damping factor may be any constant value used to reduce the threat score determined at step 510. The damping factor may be, in some embodiments, any numerical value between 0 and 1. In some embodiments, the damping factor is based on user input (e.g., selected by a system administrator). In some embodiments, decayed threat score 195*b* is represented by the following function: $f(x)=D*x$, wherein D is the damping factor and x is the threat score determined at step 510.

Decayed threat score 195*b* can also be based on a damping interval in some embodiments. The damping interval may refer to a frequency of reducing the threat score determined at step 510. As an example, the damping interval may be one hour, one day, one week, one month, and one year. In some embodiments, the damping interval is based on user input (e.g., selected by a system administrator).

As described above, there may be a maximum limit of threat score decay in some embodiments. For example, in some embodiments, a threat score may be decayed, at a maximum, to the lowest value in a risk level. A risk level may be defined by a range of values by a system administrator in some embodiments. For example, a system administrator may define that a user action is low risk if the corresponding threat score is between 0-20, is medium risk if the corresponding threat score is between 21-60, is high risk if the corresponding threat score is between 61-90, and a severe risk if the corresponding threat score is between 91-100. The system administrator may also define particular actions that fall into each risk level. For example, the system administrator may designate the following user actions as belonging to the medium risk level: (1) an invalid login; and (2) an attempt download a file having a size greater than a defined threshold. In such an example, threat score evaluator 170 may detect an invalid login and determine that such user action should be assigned a threat score between 21-60 because it is a user action having a medium risk. Threat score evaluator 170 may, as an example, assign the user action a threat score of 55 at step 510.

In the event that threat score evaluator 170 subsequently determines to decay the threat score determined at step 510, the threat score may be decayed, at a maximum, to the minimum value of a corresponding level. As such, threat score evaluator 170 may determine that the user action corresponding to the invalid login can decay, at a maximum, to 21—the minimum value associated with the medium risk level. Thus, threat score evaluator 170 may, in some embodiments, continue to decay the threat score of 55 until the decayed threat score 195*b* is 21.

After determining decayed threat score 195*b*, the method 500 continues to an end step 525 in some embodiments. In other embodiments, method 50 may include one or more steps. For example, in some embodiments, the method 500 continues from step 520 to a step 530 (not depicted). At step 530, decayed threat score 195 may be used to determine an aggregate threat score 195*a*. In some embodiments, the aggregate threat score 195*a* may be used to determine whether to suspend activity corresponding to a particular user, application, and/or action. Although this disclosure describes and depicts method 500 including certain steps, this disclosure recognizes that method 500 may include any suitable steps.

FIG. 6 illustrates an example computer system 600. As described above, threat score evaluator 170 may be a computer system such as computer system 600. Computer system 600 may be any suitable computing system in any suitable physical form. As example and not by way of limitation, computer system 600 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein (e.g., the method 400 of FIG. 4). One or more computer systems 600 may perform at different times or at different locations one or more steps of one or more methods described or illustrated herein, where appropriate.

One or more computer systems 600 may perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SEC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

Computer system 600 may include a processor 610, memory 620, storage 630, an input/output (I/O) interface 640, a communication interface 650, and a bus 660 in some embodiments, such as depicted in FIG. 6. Although this disclosure describes and illustrates a particular computer system having a particular number of particular components in a particular arrangement, this disclosure contemplates any suitable computer system having any suitable number of any suitable components in any suitable arrangement.

Processor 610 includes hardware for executing instructions, such as those making up a computer program, in particular embodiments. For example, processor 610 may execute threat score evaluator 170 to determine one or more threat scores 195. As an example and not by way of limitation, to execute instructions, processor 610 may retrieve (or fetch) the instructions from an internal register, an internal cache, memory 620, or storage 630; decode and execute them; and then write one or more results to an internal register, an internal cache, memory 620, or storage 630. In particular embodiments, processor 610 may include one or more internal caches for data, instructions, or addresses. This disclosure contemplates processor 610 including any suitable number of any suitable internal caches, where appropriate. As an example and not by way of limitation, processor 610 may include one or more instruction caches, one or more data caches, and one or more translation lookaside buffers (TLBs). Instructions in the instruction caches may be copies of instructions in memory 620 or storage 630, and the instruction caches may speed up retrieval of those instructions by processor 610. Data in the data caches may be copies of data in memory 620 or storage 630 for instructions executing at processor 610 to operate on; the results of previous instructions executed at processor 610 for access by subsequent instructions executing at processor 610 or for writing to memory 620 or storage 630; or other suitable data. The data caches may speed up read or write operations by processor 610. The TLBs may speed up virtual-address translation for processor 610. In particular embodiments, processor 610 may include one or more internal registers for data, instructions, or addresses. This disclosure contemplates processor 610 including any suitable number of any suitable internal registers, where appropriate. Where appropriate, processor 610 may include one or more arithmetic logic units (ALUs); be a multi-core processor; or include one or more processors 175. Although this disclosure describes and illustrates a particular processor, this disclosure contemplates any suitable processor.

Memory 620 may include main memory for storing instructions for processor 610 to execute or data for processor 610 to operate on. As an example and not by way of limitation, computer system 600 may load instructions from storage 630 or another source (such as, for example, another computer system 600) to memory 620. Processor 610 may then load the instructions from memory 620 to an internal register or internal cache. To execute the instructions, processor 610 may retrieve the instructions from the internal register or internal cache and decode them. During or after execution of the instructions, processor 610 may write one or more results (which may be intermediate or final results) to the internal register or internal cache. Processor 610 may then write one or more of those results to memory 620. In particular embodiments, processor 610 executes only instructions in one or more internal registers or internal caches or in memory 620 (as opposed to storage 630 or elsewhere) and operates only on data in one or more internal registers or internal caches or in memory 620 (as opposed to storage 630 or elsewhere). One or more memory buses (which may each include an address bus and a data bus) may couple processor 610 to memory 620. Bus 660 may include one or more memory buses, as described below. In particular embodiments, one or more memory management units (MMUs) reside between processor 610 and memory 620 and facilitate accesses to memory 620 requested by processor 610. In particular embodiments, memory 620 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 620 may include one or more memories 180, where appropriate. Although this disclosure describes and illustrates particular memory, this disclosure contemplates any suitable memory.

Storage 630 may include mass storage for data or instructions. As an example and not by way of limitation, storage 630 may include a hard disk drive (HDD), a floppy disk drive, flash memory, an optical disc, a magneto-optical disc, magnetic tape, or a Universal Serial Bus (USB) drive or a combination of two or more of these. Storage 630 may include removable or non-removable (or fixed) media, where appropriate. Storage 630 may be internal or external to computer system 600, where appropriate. In particular embodiments, storage 630 is non-volatile, solid-state memory. In particular embodiments, storage 630 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 630 taking any suitable physical form. Storage 630 may include one or more storage control units facilitating communication between processor 610 and storage 630, where appropriate. Where appropriate, storage 630 may include one or more storages 140. Although this disclosure describes and illustrates particular storage, this disclosure contemplates any suitable storage.

I/O interface 640 may include hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 185 for them. Where appropriate, I/O interface 640 may include one or more device or software drivers enabling processor 610 to drive one or more of these I/O devices. I/O interface 640 may include one or more I/O interfaces 185, where appropriate. Although this disclosure describes and illustrates a particular I/O interface, this disclosure contemplates any suitable I/O interface.

Communication interface 650 may include hardware, software, or both providing one or more interfaces for communication (such as, for example, packet-based communication) between computer system 600 and one or more other computer systems 600 or one or more networks (e.g., network 105). As an example and not by way of limitation, communication interface 650 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 650 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 650 for any of these networks, where appropriate. Communication interface 650 may include one or more communication interfaces 190, where appropriate. Although this disclosure describes and illustrates a particular communication interface, this disclosure contemplates any suitable communication interface.

Bus 660 may include hardware, software, or both coupling components of computer system 600 to each other. As an example and not by way of limitation, bus 660 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 660 may include one or more buses 212, where appropriate. Although this disclosure describes and illustrates a particular bus, this disclosure contemplates any suitable bus or interconnect.

The components of computer system 600 may be integrated or separated. In some embodiments, components of computer system 600 may each be housed within a single chassis. The operations of computer system 600 may be performed by more, fewer, or other components. Additionally, operations of computer system 600 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computerized system comprising:
   a computer processor;
   a memory configured to store instructions, the instructions when executed by the computer processor are operable to:
   determine a threat score for a user action in a computer application, the threat score being indicative of a risk presented by the user action;
   calculate a decayed threat score based on the determined threat score, a damping factor, and a damping interval, the decayed threat score being a modified threat score for the user action, the damping factor being a constant value used to reduce the determined threat score, and the damping interval corresponding to a frequency in which the determined threat score is reduced;
   determine an aggregate threat score based on the decayed threat score; and
   suspend, based on the aggregate threat score, user activity corresponding to one or more of:
   a particular computer user;
   a particular computer application; and
   a particular activity.

2. The computerized system of claim 1, wherein the damping factor is a value between 0 and 1.

3. The computerized system of claim 1, wherein the determined threat score is reduced to a decayed threat score based on a determination that the user action is non-threatening.

4. The computerized system of claim 1, wherein:
   the instructions when executed by the computer processor are further operable to identify a risk level corresponding to the determined threat score, wherein the risk level comprises a range of threat scores; and
   the decayed threat score is reduced at a maximum to a minimum value in the range of the corresponding risk level.

5. A computer-implemented method performed by a computing device comprising at least one processor, the method comprising:
   determining a threat score for a user action in a computer application, the threat score being indicative of a risk presented by the user action;
   calculating a decayed threat score based on the determined threat score, a damping factor, and a damping interval, the decayed threat score being a modified threat score for the user action, the damping factor being a constant value used to reduce the determined threat score, and the damping interval corresponding to a frequency in which the determined threat score is reduced;
   determining an aggregate threat score based on the decayed threat score; and
   suspending, based on the aggregate threat score, user activity corresponding to one or more of:
   a particular computer user;
   a particular computer application; and
   a particular activity.

6. The computer-implemented method of claim 5, wherein the damping factor is a value between 0 and 1.

7. The computer-implemented method of claim 5, wherein the determined threat score is reduced to a decayed threat score based on a determination that the user action is non-threatening.

8. The computer-implemented method of claim 5, further comprising:
   identifying a risk level corresponding to the determined threat score, wherein the risk level comprises a range of threat scores; and
   wherein the decayed threat score is reduced at a maximum to a minimum value in the range of the corresponding risk level.

9. One or more computer-readable non-transitory storage media in one or more computing systems, the media embodying logic that is operable when executed by a computer processor to:
   determine a threat score for a user action in a computer application, the threat score being indicative of a risk presented by the user action;
   calculate a decayed threat score based on the determined threat score, a damping factor, and a damping interval, the decayed threat score being a modified threat score for the user action, the damping factor being a constant value used to reduce the determined threat score, and the damping interval corresponding to a frequency in which the determined threat score is reduced;
   determine an aggregate threat score based on the decayed threat score; and
   suspend, based on the aggregate threat score, user activity corresponding to one or more of:
      a particular computer user;
      a particular computer application; and
      a particular activity.

10. The media of claim 9, the media embodying logic that is further operable when executed by the computer processor to:
   identify a risk level corresponding to the determined threat score, wherein the risk level comprises a range of threat scores; and
   wherein the decayed threat score is reduced at a maximum to a minimum value in the range of the corresponding risk level.

* * * * *